US007793417B2

(12) United States Patent
Akabane

(10) Patent No.: US 7,793,417 B2
(45) Date of Patent: Sep. 14, 2010

(54) PROCESS FOR PRODUCING ELECTROMAGNETIC FUEL INJECTION VALVE

(75) Inventor: Akira Akabane, Miyagi (JP)

(73) Assignee: Keihin Corporation, Tokyo (JP)

( * ) Notice: Subject to any disclaimer, the term of this patent is extended or adjusted under 35 U.S.C. 154(b) by 988 days.

(21) Appl. No.: 11/579,122

(22) PCT Filed: Jun. 10, 2005

(86) PCT No.: PCT/JP2005/010654

§ 371 (c)(1),
(2), (4) Date: Oct. 31, 2006

(87) PCT Pub. No.: WO2006/001181

PCT Pub. Date: Jan. 5, 2006

(65) Prior Publication Data

US 2007/0220747 A1 Sep. 27, 2007

(30) Foreign Application Priority Data

Jun. 29, 2004 (JP) ............................. 2004-191489

(51) Int. Cl.

| | |
|---|---|
| ***B05B 1/30*** | (2006.01) |
| ***B21D 39/00*** | (2006.01) |
| ***B21D 39/03*** | (2006.01) |
| ***B21K 1/22*** | (2006.01) |
| ***B21K 1/24*** | (2006.01) |
| ***F16K 23/00*** | (2006.01) |

(52) U.S. Cl. ..................... 29/888.4; 29/888.44; 29/521; 29/516; 29/445; 29/428; 137/15.18; 137/315.01; 239/584; 239/585.1; 251/143

(58) Field of Classification Search ................... 29/428, 29/445, 505, 516, 521, 525, 888.4, 888.41, 29/888.44; 137/15.18, 315.01; 239/584, 239/285.1–285.5
See application file for complete search history.

(56) References Cited

FOREIGN PATENT DOCUMENTS

| | | | |
|---|---|---|---|
| GB | 2151516 | A | * 11/1984 |
| JP | 2002-31009 | A | 1/2002 |
| JP | 2002-89400 | A1 | 3/2002 |

* cited by examiner

*Primary Examiner*—David P Bryant
*Assistant Examiner*—Alexander P Taousakis
(74) *Attorney, Agent, or Firm*—Arent Fox LLP

(57) ABSTRACT

A process for producing an electromagnetic fuel injection valve is provided, the electromagnetic fuel injection valve having a structure in which a valve assembly formed by coaxially joining a movable core and a valve body is spring-biased toward the side on which the valve assembly is seated on a valve seat while restricting an end thereof that is in proximity to a fixed core, and in the process a first distance (L1) between the front end of the fixed core (22) and the front end of a cylindrical magnetic body (9) is measured, a stopper (28) and the movable core (18) are formed so that a second distance (L2) between an annular shoulder portion (10*c*) of a valve seat member (10) and the rear end of the stopper (28) projecting by a predetermined amount from the rear end of the movable core (18) in a state in which the valve seat member (10) and the valve assembly (17) are held coaxially is smaller than the first distance (L1) by a desired value, and the cylindrical magnetic body (9) and the valve seat member (10) are butt-welded in a state in which a tubular press-fit portion (10*a*) is press-fitted into a front portion of the cylindrical magnetic body (9) until the annular shoulder portion (10*c*) abuts against the front end of the cylindrical magnetic body (9). This enables the stroke of the valve body to be adjusted easily while reducing the cost, and the valve seat member and the cylindrical magnetic body to be joined while enhancing the coaxial precision.

1 Claim, 5 Drawing Sheets

PROCESS FOR PRODUCING ELECTROMAGNETIC FUEL INJECTION VALVE

CROSS-REFERENCE TO RELATED APPLICATION

This application is a National Stage entry of International Application No. PCT/JP2005/010654, filed Jun. 10, 2005, the entire specification claims and drawings of which are incorporated herewith by reference.

TECHNICAL FIELD

The present invention relates to an improvement of a process for producing an electromagnetic fuel injection valve in which the rear end of a cylindrical magnetic body is coaxially joined to a fixed core via a cylindrical non-magnetic body, the front end of the cylindrical magnetic body being coaxially joined to a valve seat member having a valve seat so that the valve seat member and the cylindrical magnetic body together form a valve housing, and a valve assembly is formed by coaxially connecting a movable core and a valve body, the movable core having the rear end thereof opposing the front end of the fixed core so that an end of the movable core that is in proximity to the fixed core is restricted, the valve body being housed in the valve housing so that the valve body can be seated on the valve seat, and the valve assembly being spring-biased toward the side on which the valve body is seated on the valve seat.

BACKGROUND ART

Such an electromagnetic fuel injection valve is known from, for example, Patent Document 1, in which a large diameter hole is coaxially provided in a front portion of a cylindrical magnetic body so as to form an annular step portion facing forward, a ring-shaped stopper that, by making an annular restricting step portion on a valve body side abut against the stopper, restricts a moving end of the valve body on the side on which the valve body separates from a valve seat, that is, an end of a movable core that is in proximity to a fixed core, is inserted into the large diameter hole so as to abut against the annular step portion, a rear portion of a valve seat member is press-fitted into the large diameter hole so that the rear end of the rear portion abuts against the stopper, and corner portions formed from the front end of the cylindrical magnetic body and the outer periphery of the valve seat member are welded together along the entire periphery.

Patent Document 1:

Japanese Patent Application Laid-open No. 2002-89400

DISCLOSURE OF THE INVENTION

Problem to be Solved by the Invention

In the above-mentioned conventional arrangement, an operating stroke of the valve body is the distance between the restricting step portion on the valve body side in a state in which the valve body abuts against the valve seat and the stopper, that is, the rear end of the valve seat member, and the above-mentioned distance, that is, the operating stroke, is adjusted by grinding a rear end face of the valve seat member when producing the electromagnetic fuel injection valve. In order to obtain accurate coaxiality between the cylindrical magnetic body and the valve seat member in a state in which the valve seat member is press-fitted into the large diameter hole of the cylindrical magnetic body so that the rear end of the valve seat member abuts against the stopper, which abuts against the annular step portion, the valve seat member is prepared by machining so that the angle formed between the outer peripheral face and the rear end face thereof is accurately a right angle, but if the rear end face of the valve seat member is ground as in the above-mentioned conventional manner, there is a possibility that the right angle between the outer peripheral face and the rear end face of the valve seat member might not be maintained. Furthermore, an air gap is set between the movable core and the fixed core when the valve body is separated from the valve seat, and when adjusting the air gap in the above-mentioned conventional arrangement, a plurality of types of stoppers having different thicknesses are prepared in advance, and the air gap is set by selecting one from the above stoppers, thus incurring an increase in cost.

The present invention has been accomplished under the above-mentioned circumstances, and it is an object thereof to provide a process for producing an electromagnetic fuel injection valve that enables the stroke of the valve body to be adjusted easily while reducing the cost and, moreover, enables the valve seat member and the cylindrical magnetic body to be joined while enhancing the coaxial precision.

Means for Solving the Problem

In order to attain the above object, in accordance with an aspect of the present invention, there is provided a process for producing an electromagnetic fuel injection valve in which the rear end of a cylindrical magnetic body is coaxially joined to a fixed core via a cylindrical non-magnetic body, the front end of the cylindrical magnetic body being coaxially joined to a valve seat member having a valve seat so that the cylindrical magnetic body and the valve seat member together form a valve housing, and a valve assembly is formed by coaxially connecting a movable core and a valve body, the movable core having a rear end thereof opposing the front end of the fixed core so that an end of the movable core that is in proximity to the fixed core is restrained, the valve body being housed in the valve housing so that the valve body can be seated on the valve seat, and the valve assembly being spring-biased toward the side on which the valve body is seated on the valve seat, the process comprising in sequence:

a first step of providing the valve seat member with a tubular press-fit portion that can be press-fitted into a front portion of the cylindrical magnetic body, a large diameter portion that is formed so as to have a larger diameter than that of the tubular press-fit portion and substantially the same outer diameter as the outer diameter of the cylindrical magnetic body, and an annular shoulder portion that is formed as a flat face perpendicular to an outer peripheral face of the tubular press-fit portion and provides a connection between the tubular press-fit portion and the large diameter portion, and fixing a stopper material made of a non-magnetic material for forming a stopper that is to abut against the fixed core to the rear end of a movable core material for forming the movable core;

a second step of measuring a first distance between the front end of the fixed core and the front end of the cylindrical magnetic body in a state in which the cylindrical magnetic body is coaxially joined to the fixed core via the cylindrical non-magnetic body;

a third step of forming the stopper and the movable core by simultaneously grinding rear ends of the stopper material and the movable core material so that a second distance between the annular shoulder portion and the rear end of the stopper projecting by a predetermined amount from the rear end of the movable core in a state in which the valve body is seated on the valve seat and the valve seat member and the valve assembly are held coaxially is smaller than the first distance by a desired value; and a fourth step of butt-welding the cylindrical magnetic body and the valve seat member in a state in which the tubular press-fit portion is press-fitted into the front portion of the cylindrical magnetic body until the annular shoulder portion abuts against the front end of the cylindrical magnetic body.

EFFECT OF THE INVENTION

In accordance with the present invention, by forming the stopper and the movable core by simultaneously grinding the rear ends of the stopper material and the movable core material so that the rear end of the stopper projects from the rear end of the movable core by a predetermined amount that corresponds to a required air gap between the movable core and the fixed core, it is possible to set a desired air gap without requiring a plurality of types of components corresponding to different air gaps. Moreover, since a value obtained by adding a desired value corresponding to a required valve operating stroke to the second distance between the rear end of the stopper and the annular step portion of the valve member becomes equal to the first distance between the front end of the fixed core and the front end of the cylindrical magnetic body, the valve operating stroke can be adjusted by simultaneously grinding the rear ends of the stopper material and the movable core material so that the second distance becomes smaller than the measured first distance by the desired value, thereby decreasing the number of production steps. Furthermore, it is possible to make the first distance constant regardless of whether or not the valve operating stroke changes, thus making it easy to manage, and since the valve seat member is not subjected to machining when assembling the electromagnetic fuel injection valve, the valve seat member and the cylindrical magnetic body can be joined together by utilizing the precision of each component, thereby enabling the coaxial precision between the valve seat member and the cylindrical magnetic body to be enhanced.

DESCRIPTION OF REFERENCE NUMERALS AND CHARACTERS

Figure 1:
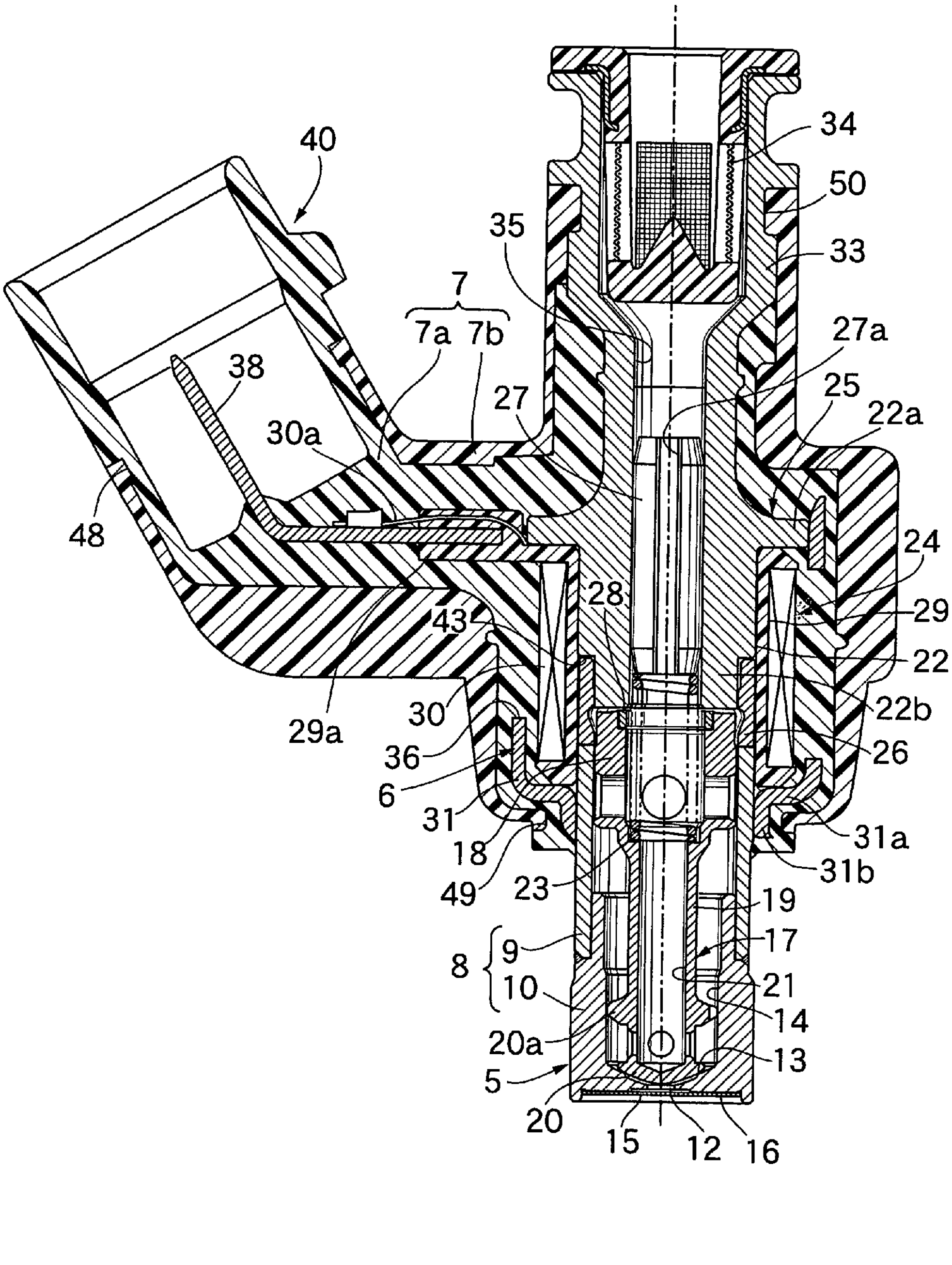
FIG. 1 is a vertical sectional view of an electromagnetic fuel injection valve (first embodiment).

8 valve housing
9 cylindrical magnetic body
10 valve seat member
10*a* tubular press-fit portion
10*b* large diameter portion
10*c* annular shoulder portion
13 valve seat
17 valve assembly
18 movable core
18' movable core material
20 valve body
22 fixed core
26 cylindrical non-magnetic body
28 stopper
28' stopper material
L1 first distance
L2 second distance

BEST MODE FOR CARRYING OUT THE INVENTION

A mode for carrying out the present invention is explained below by reference to one embodiment of the present invention shown in the attached drawings.

Embodiment 1

One embodiment of the present invention is explained by reference to FIG. 1 to FIG. 5; firstly in FIG. 1 an electromagnetic fuel injection valve for injecting fuel into an engine (not illustrated) includes a valve section 5 in which a valve body 20 is housed within a valve housing 8 having a valve seat 13 at the front end thereof, the valve body 20 being spring-biased in a direction that seats the valve body 20 on the valve seat 13, a solenoid section 6 in which a coil assembly 24 is housed in a solenoid housing 25 provided so as to be connected to the valve housing 8, the coil assembly 24 being capable of exhibiting an electromagnetic force for operating the valve body 20 so as to make it separate from the valve seat 13, and a synthetic resin covering section 7 having an integral coupler 40, connecting terminals 38 connected to a coil 30 of the coil assembly 24 facing the coupler 40, and at least the coil assembly 24 and the solenoid housing 25 being embedded in the covering section 7.

The valve housing 8 is formed from a cylindrical magnetic body 9 made of a magnetic metal and a valve seat member 10 that is joined in a liquid-tight manner to a front portion of the cylindrical magnetic body 9 by welding while in a press-fitted state. The valve seat member 10 is welded to the cylindrical magnetic body 9 in a state in which a rear end portion of the valve seat member 10 is fitted into a front end portion of the cylindrical magnetic body 9, and this valve seat member 10 is coaxially provided with a fuel outlet hole 12 opening on the front end face thereof, a tapered valve seat 13 connected to the inner end of the fuel outlet hole 12, and a guide hole 14 connected to a large diameter portion at the rear end of the valve seat 13 so as to guide the valve body 20. An injector plate 16 made of a steel plate is welded in a liquid-tight manner along its entire periphery to the front end of the valve seat member 10, the injector plate 16 having a plurality of fuel injection holes 15 communicating with the fuel outlet hole 12.

The solenoid section 6 includes a cylindrical movable core 18, a cylindrical fixed core 22 facing the movable core 18, a return spring 23 exhibiting a spring force that urges the movable core 18 away from the fixed core 22, a coil assembly 24 disposed so as to surround a rear portion of the valve housing 8 and the fixed core 22 while being capable of exhibiting an electromagnetic force that allows the movable core 18 to be attracted to the fixed core 22 side against the spring force of the return spring 23, and a solenoid housing 25 surrounding the coil assembly 24 so that a front end portion of the solenoid housing 25 is connected to the valve housing 8.

The movable core 18 is slidably fitted into the rear portion within the valve housing 8, and the movable core 18 is coaxially joined to the valve body 20, which can be seated on the valve seat 13 so as to block the fuel outlet hole 12, thus forming a valve assembly 17. In this embodiment, the valve assembly 17 is formed from the movable core 18, a valve shaft 19 connected integrally to the movable core 18, and the valve body 20 formed integrally with the front end of the valve shaft 19, a through hole 21 is formed coaxially in this valve assembly 17, the through hole 21 communicating with the interior of the valve housing 8 and having a bottomed shape with its front end blocked, and the valve assembly 17 is urged by the return spring 23 in a direction that seats the valve body 20 on the valve seat 13.

The rear end of the cylindrical magnetic body 9 of the valve housing 8 is coaxially joined to the front end of the fixed core 22 via a cylindrical non-magnetic body 26, which is a non-magnetic member made of a non-magnetic metal such as stainless steel so as to have a circular cross-section, the rear end of the cylindrical magnetic body 9 is butt-welded to the front end of the cylindrical non-magnetic body 26, and the rear end of the cylindrical non-magnetic body 26 is welded to the fixed core 22 in a state in which a front end portion of the fixed core 22 is fitted into the cylindrical non-magnetic body 26.

A tubular retainer 27 is coaxially press-fitted into the fixed core 22, the tubular retainer 27 having one slit 27*a* extending in the axial direction and having a substantially C-shaped cross-section, and the return spring 23 is disposed between the retainer 27 and the movable core 18. In order to avoid the movable core 18 from being in direct contact with the fixed core 22, a ring-shaped stopper 28 made of a non-magnetic material is press-fitted into the inner periphery of a rear end portion of the movable core 18 so that the ring-shaped stopper 28 projects slightly from a rear end face of the movable core 18 toward the fixed core 22. Furthermore, the coil assembly 24 is formed by winding a coil 30 around a bobbin 29 surrounding a rear portion of the valve housing 8, the cylindrical non-magnetic body 26, and the fixed core 22.

The solenoid housing 25 is formed from a cylindrical magnetic frame 31 and a flange portion 22*a*, the cylindrical magnetic frame 31 being made of a magnetic metal in a cylindrical shape having at one end thereof an annular end wall 31*a* facing an end portion of the coil assembly 24 on the valve section 5 side and surrounding the coil assembly 24, the flange portion 22*a* protruding radially outward from a rear end portion of the fixed core 22 and facing an end portion of the coil assembly 24 on the side opposite to the valve section 5, and the flange portion 22*a* being magnetically coupled to the other end portion of the magnetic frame 31. Moreover, a tubular mating portion 31*b* is coaxially provided on the inner periphery of the end wall 31*a* of the magnetic frame 31, the cylindrical magnetic body 9 of the valve housing 8 being fitted into the tubular mating portion 31*b*, and the solenoid housing 25 is provided so as to be connected to the valve housing 8 by fitting the valve housing 8 into the tubular mating portion 31*b*.

A cylindrical inlet tube 33 is integrally and coaxially connected to the rear end of the fixed core 22, and a fuel filter 34 is mounted on a rear portion of the inlet tube 33. Moreover, a fuel passage 35 is coaxially provided in the inlet tube 33, the retainer 23, and the fixed core 22, the fuel passage 35 communicating with the through hole 21 of the movable core 18.

The covering section 7 is formed so as to embed not only the solenoid housing 25 and the coil assembly 24 but also a part of the valve housing 8 and a majority of the inlet tube 33 while filling in a gap between the solenoid housing 25 and the coil assembly 24, and a cutout portion 36 is provided in the magnetic frame 31 of the solenoid housing 25, the cutout portion 36 allowing an arm portion 29*a* formed integrally with the bobbin 29 of the coil assembly 24 to be disposed outside the solenoid housing 25.

The coupler 40 is provided integrally with the covering section 7, the connecting terminals 38 connected to opposite ends of the coil 30 of the coil assembly 24 facing the coupler 40, the base end of the connecting terminal 38 being embedded in the arm portion 29*a*, and coil ends 30*a* of the coil 30 being welded to the connecting terminals 38.

The covering section 7 is formed from a first resin molded layer 7*a* covering the solenoid housing 25 and forming part of the coupler 40, and a second resin molded layer 7*b* covering the first resin molded layer 7*a*. The first resin molded layer 7*a* on the extremity side relative to a middle portion of the coupler 40 is not covered by the second resin molded layer 7*b* but exposed to the outside, a rear portion of the inlet tube 33 is not covered by the second resin molded layer 7*b* but exposed to the outside and, furthermore, a portion of the first resin molded layer 7*a* corresponding to a rear portion of the valve housing 8 is not covered by the second resin molded layer 7*b* but exposed to the outside. Endless engagement channels 48 and 49 are formed in portions of the first resin molded layer 7*a* corresponding to the middle portion of the coupler 40 and the rear portion of the valve housing 8, end portions of the second resin molded layer 7*b* being engaged with the engagement channels 48 and 49, and an endless engagement channel 50 is provided on the outer periphery of the middle portion of the inlet tube 33, an end portion of the second resin molded layer 7*b* being engaged with the engagement channel 50. That is, the end portions of the second covering section 7*b* are made to interlock with the first covering section 7*a* and the inlet tube 33 via concavo-convex engagement.

The front end of the cylindrical non-magnetic body 26 is coaxially joined by butt-welding to the rear end of the cylindrical magnetic body 9 of the valve housing 8 so as to surround part of the movable core 18, and a front portion of the fixed core 22 is fitted into and fixed to a rear portion of the cylindrical non-magnetic body 26, the front end of the fixed core 22 facing the rear end of the movable core 18.

A small diameter mating portion 22*b* is coaxially provided on the front portion of the fixed core 22, the small diameter mating portion 22*b* having formed on the outer peripheral side thereof an annular step portion 43 facing forward, this small diameter mating portion 22*b* is fitted into the rear portion of the cylindrical non-magnetic body 26 until the step portion 43 abuts against the rear end of the cylindrical non-magnetic body 26 so that the small diameter mating portion 22*b* is in intimate contact with the inner face of a middle portion of the cylindrical non-magnetic body 26, and in this state the fixed core 22 is fixed by welding to the cylindrical non-magnetic body 26.

Figure 2:
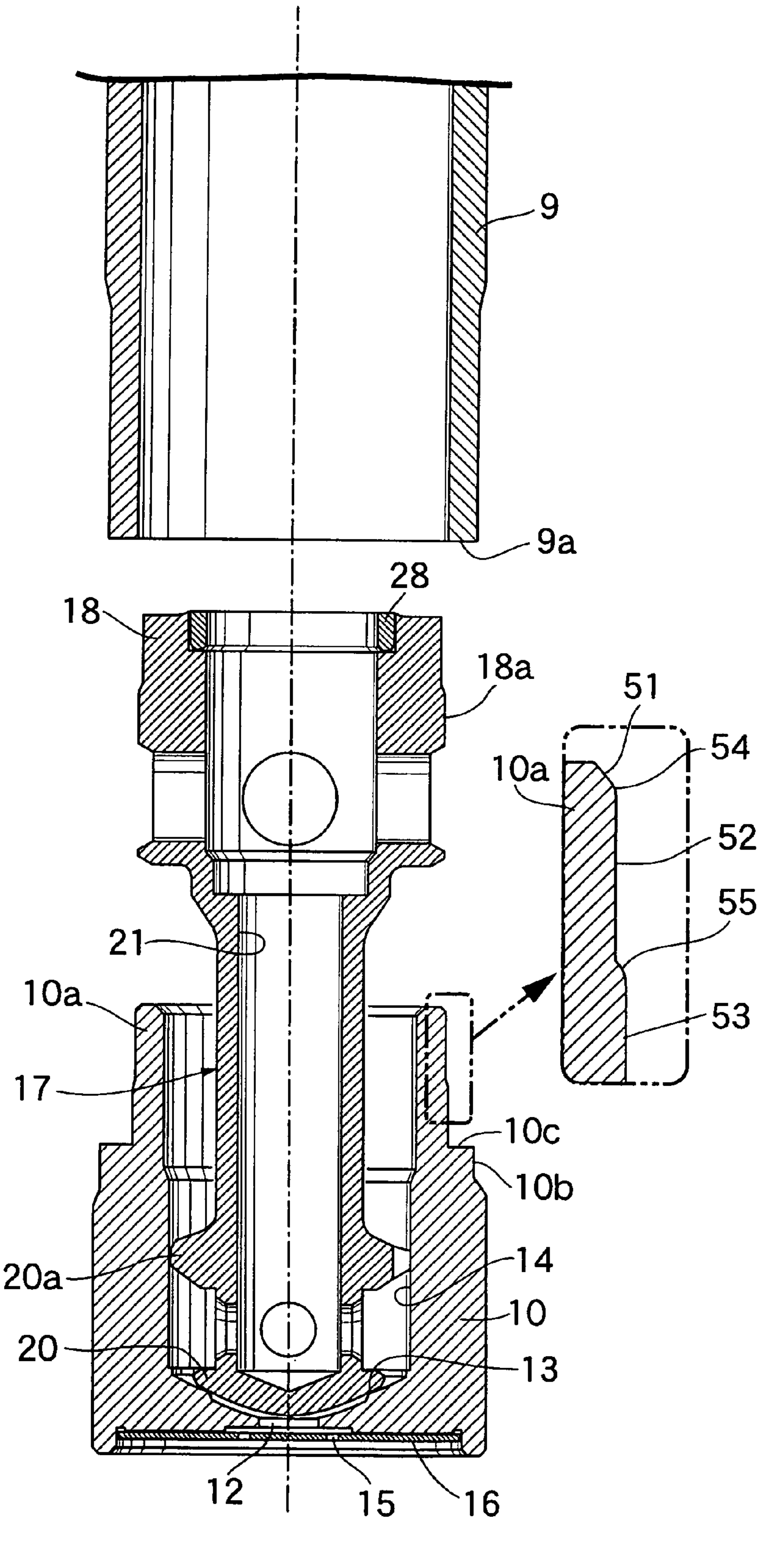
FIG. 2 is an exploded enlarged sectional view showing a structure with which a valve seat member is press-fitted to a cylindrical magnetic body (first embodiment).

Referring in addition to FIG. 2, a guide portion 18*a* is provided in a middle portion of the movable core 18, the guide portion 18*a* being in sliding contact with an inner peripheral face of a rear portion of the cylindrical magnetic body 9, and the valve body 20 is provided with a journal portion 20*a* slidably fitted into an inner peripheral face of the valve seat member 10, that is, the guide hole 14.

The valve seat member 10 is provided with a tubular press-fit portion 10*a* that is press-fitted into the front portion of the cylindrical magnetic body 9, a large diameter portion 10*b* that is formed so as to have a larger diameter than that of the tubular press-fit portion 10*a* and substantially the same outer diameter as the outer diameter of the cylindrical magnetic body 9, and an annular shoulder portion 10*c* that is formed as a flat face perpendicular to the outer peripheral face of the tubular press-fit portion 10*a* and provides a connection between the tubular press-fit portion 10*a* and the large diameter portion 10*b*.

Moreover, the outer periphery of the tubular press-fit portion 10*a* is provided with, in sequence going from the extremity side, a tapered guide face 51 that guides insertion into the front portion of the cylindrical magnetic body 9, a coaxial adjustment face 52 having a cylindrical shape with a diameter larger than that of a large diameter portion of the guide face 51 and being capable of fitting into the inner peripheral face of the front portion of the cylindrical magnetic body 9, and a press-fitting face 53 that has a cylindrical shape with a larger diameter than that of the adjustment face 52 and is press-fitted into the inner peripheral face of the front portion of the cylindrical magnetic body 9; a first arc face 54 providing a connection between the guide face 51 and the adjustment face 52, and a second arc face 55 providing a connection between the adjustment face 52 and the press-fitting face 53 are also formed.

In accordance with the outer periphery of the tubular press-fit portion 10*a* being in such a shape, when press-fitting the tubular press-fit portion 10*a* into the cylindrical magnetic body 9, insertion into the cylindrical magnetic body 9 is first guided by the tapered guide face 51, subsequent fitting of the cylindrical adjustment face 52 into the inner periphery of the front portion of the cylindrical magnetic body 9 enables the coaxiality of the cylindrical magnetic body 9 and the tubular press-fit portion 10*a* to be guaranteed, and finally press-fitting the cylindrical press-fitting face 53 into the inner periphery of the front portion of the cylindrical magnetic body 9 enables the tubular press-fit portion 10*a* to be firmly press-fitted into the front portion of the cylindrical magnetic body 9 while ensuring high coaxiality.

Moreover, since a step portion between the guide face 51 and the adjustment face 52 and a step portion between the adjustment face 52 and the press-fitting face 53 are in an arc shape by virtue of the first and second arc faces 54 and 55, the first and second arc faces 54 and 55 exhibit the function of guiding the fitting of the following adjustment face 52 or press-fitting face 53 into the cylindrical magnetic body 9, and it is thereby possible to smoothly press-fit the tubular press-fit portion 10*a* into the cylindrical magnetic body 9 while maintaining accurate coaxiality between 10*a* and 9. Therefore, swarf is not generated, and it is possible to avoid the fuel passage being blocked by swarf.

An annular abutment receiving face 9*a* on the front end of the cylindrical magnetic body 9 is formed so as to define a right angle relative to the inner peripheral face of the cylindrical magnetic body 9, the annular abutment receiving face 9*a* abutting against the annular shoulder portion 10*c* over substantially the entire face thereof when the tubular press-fit portion 10*a* is press-fitted into the front portion of the cylindrical magnetic body 9.

Moreover, the right angle between the tubular press-fit portion 10*a* and the annular shoulder portion 10*c* of the valve seat member 10 is defined by grinding using the same grinding tool as when grinding the valve seat member 10, and the abutment receiving face 9*a* and the inner peripheral face of the front portion of the cylindrical magnetic body 9 are defined by grinding using the same grinding tool as when grinding the cylindrical magnetic body 9, and it is thereby possible to improve the precision of the right angle between the tubular press-fit portion 10*a* and the annular shoulder portion 10*c* and the right angle between the abutment receiving face 9*a* and the inner peripheral face of the front portion of the cylindrical magnetic body 9.

Figure 3:
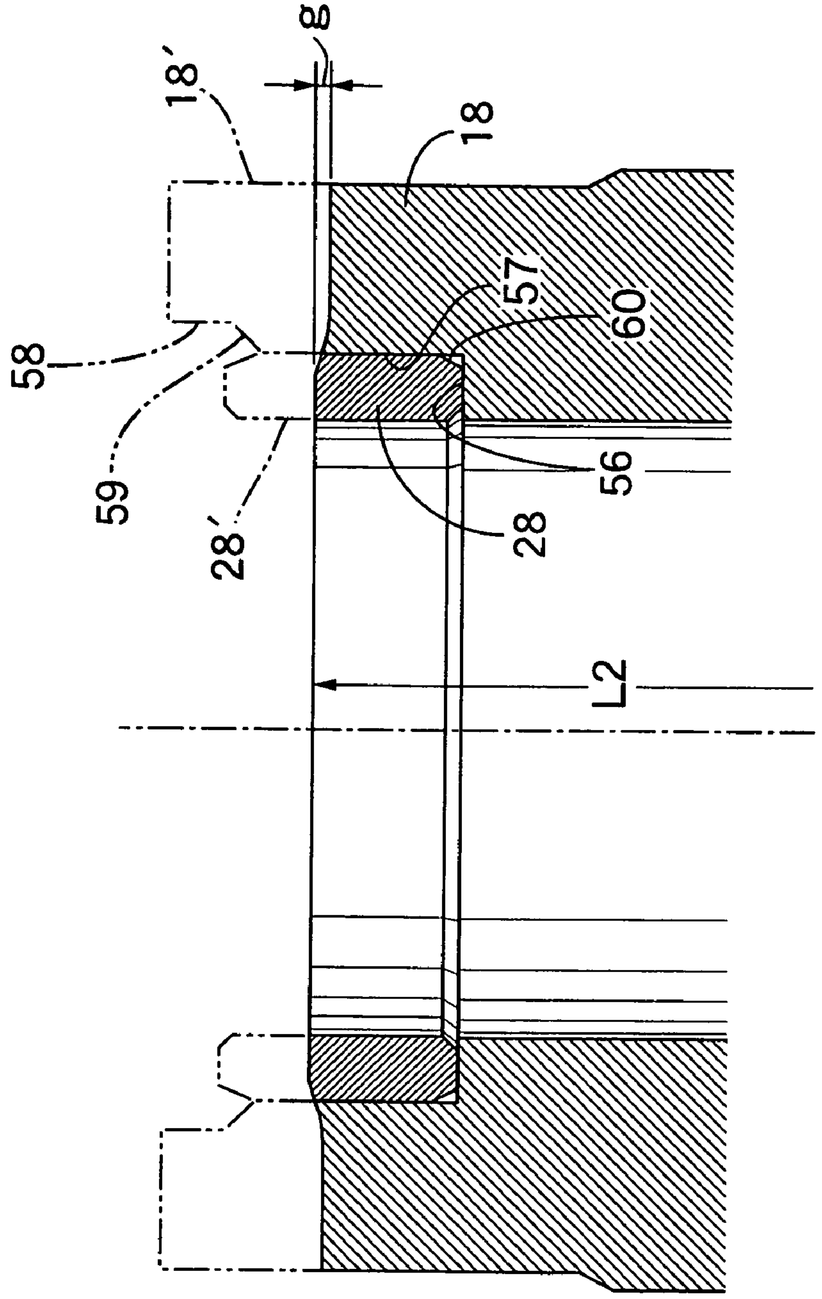
FIG. 3 is a sectional view for explaining simultaneous machining of rear ends of a movable core material and a stopper material (first embodiment).

Such an electromagnetic fuel injection valve is produced by carrying out the following first to fourth steps in sequence. First of all, in the first step, the tubular press-fit portion 10*a*, the large diameter portion 10*b*, and the annular shoulder portion 10*c* are provided on the valve member 10, and as shown in FIG. 3, a stopper material 28' made of a non-magnetic material is fixed by press-fitting into the rear end of the movable core material 18'.

The movable core material 18' is formed in a cylindrical shape extending further to the rear than the movable core 18 that is to be formed, the inner periphery of a rear portion of the movable core material 18' is coaxially provided with a small diameter hole 57 having an annular step portion 56 formed at the inner end thereof, and a large diameter hole 58 formed so as to open at the rear end of the movable core material 18' and have a larger diameter than that of the small diameter hole 57, and a tapered step portion 59 is formed between the small diameter hole 57 and the large diameter hole 58. The stopper material 28' is also formed so as to be axially longer than the stopper 28 that is to be formed, and a tapered chamfered portion 60 is provided on the outer periphery at the front end of the stopper material 28'.

The front portion of the stopper material 28' is subsequently press-fitted into the small diameter hole 57 of the rear portion of the movable core material 18' until the front end of the stopper material 28' abuts against the step portion 56, and during this process, since the rear end of the small diameter hole 57 is continuous, via the tapered step portion 59, with the large diameter hole 58, which opens at the rear end of the movable core material 18', and the chamfered portion 60 is provided on the outer periphery at the front end of the stopper material 28', the operation of press-fitting the stopper material 28' into the small diameter hole 57 of the rear portion of the movable core material 18' becomes easy.

Figure 4:
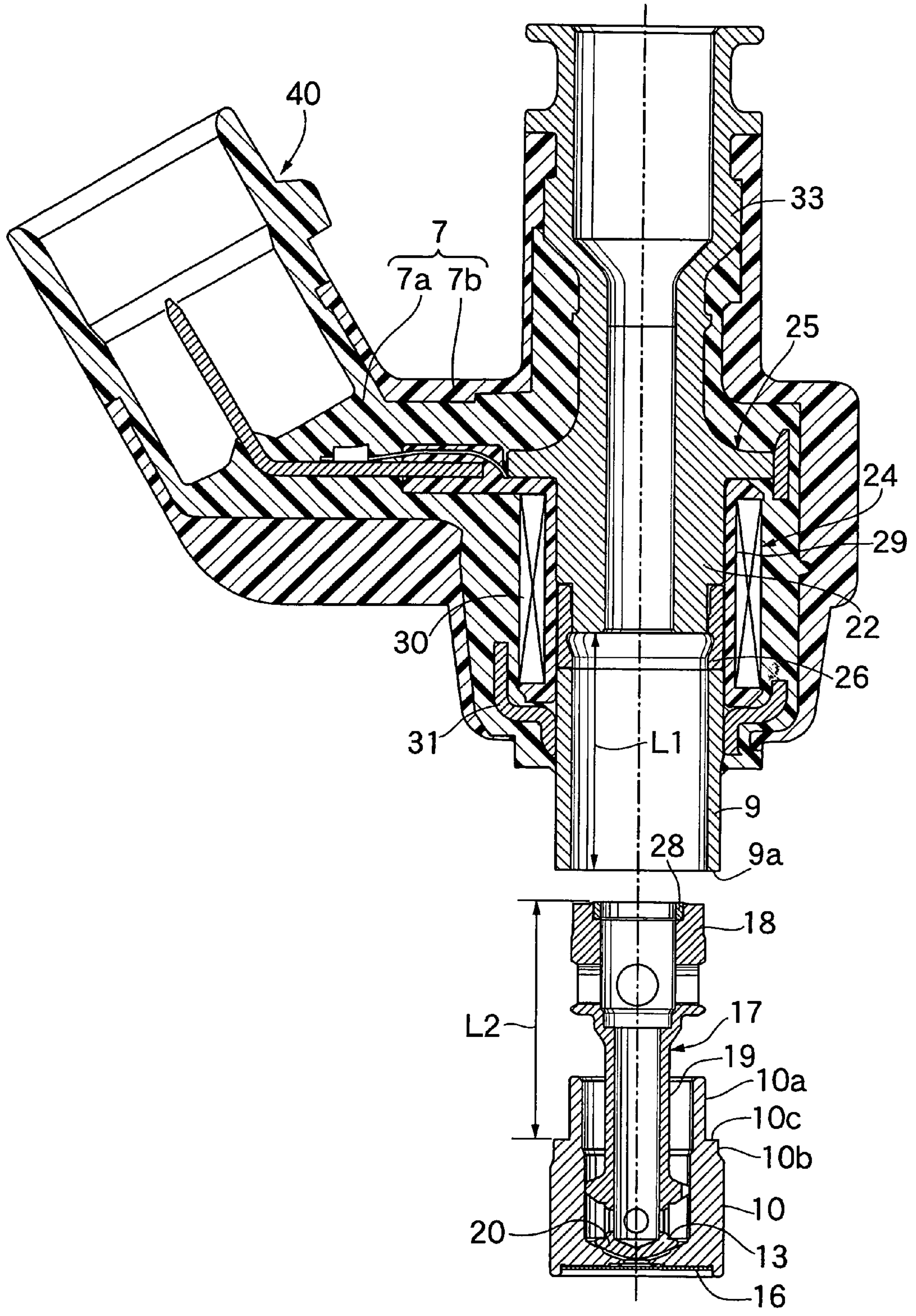
FIG. 4 is a sectional view partway through assembly of the electromagnetic fuel injection valve (first embodiment).

In the subsequent second step, as shown in FIG. 4, a unit is prepared by joining the cylindrical magnetic body 9, via the cylindrical non-magnetic body 26, to the fixed core 22 forming part of the solenoid housing 25 which, together with the coil assembly 24, is covered by the covering portion 7, and a first distance L1 between the front end of the fixed core 22 and the front end of the cylindrical magnetic body 9 is measured.

In the third step, the rear end of the stopper material 28' and the rear end of the movable core material 18' are simultaneously ground so that a second distance L2 between the annular shoulder portion 10*c* of the valve seat member 10 and the rear end of the stopper 28, which projects from the rear end of the movable core 18 by a predetermined amount in a state in which the valve body 20 is seated on the valve seat 13 and the valve seat member 10 and the valve assembly 17 are held coaxially, is smaller than the first distance L1 by a desired value.

That is, as shown by a broken line in FIG. 3, after the stopper material 28' is press-fitted into the rear portion of the movable core material 18', by simultaneously grinding rear portions of the stopper material 28' and the movable core material 18', the rear portions of the stopper material 28' and the movable core material 18' can be removed so as to satisfy the requirement for the second distance L2, thus forming the stopper 28 and the movable core 18.

A valve operating stroke is obtained by subtracting the second distance L2 from the first distance L1. When the stopper 28 abuts against the fixed core 22 so that the movable core 18 is at its closest to the fixed core 22, an air gap g is formed between the fixed core 22 and the movable core 18, and since the rear end of the stopper 28 is determined by setting the second distance L2 in order to guarantee a necessary valve operating stroke, the rear end of the movable core 18 is set so as to be positioned forward of the rear end of the stopper 28 by a distance corresponding to the necessary air gap g.

Figure 5:
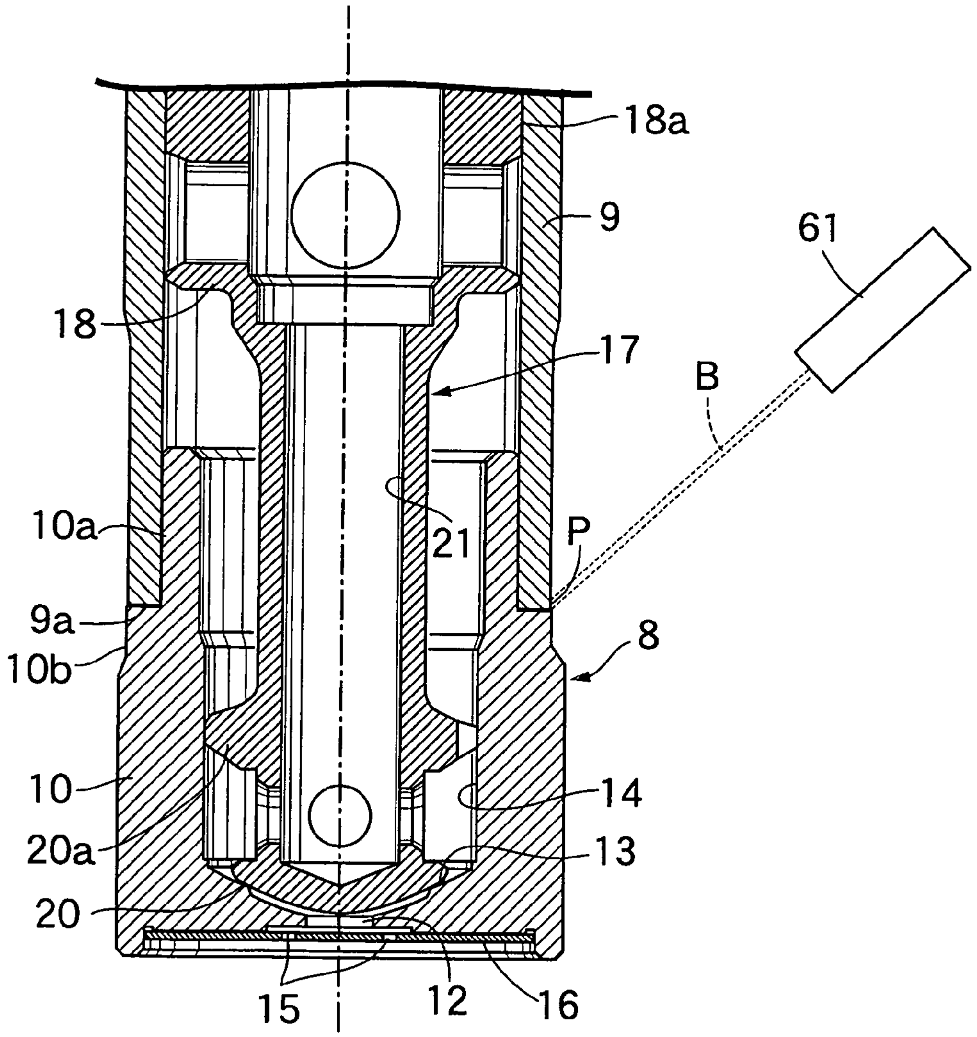
FIG. 5 is an enlarged sectional view showing a structure of a part where the cylindrical magnetic body and the valve seat member are welded (first embodiment).

Furthermore, in the fourth step, as shown in FIG. 5, the cylindrical magnetic body 9 and the valve seat member 10 are butt-welded in a state in which the tubular press-fit portion 10*a* of the valve seat member 10 is press-fitted into the front portion of the cylindrical magnetic body 9 until the annular shoulder portion 10*c* abuts against the front end of the cylindrical magnetic body 9.

During this stage, the front end of the cylindrical magnetic body 9 and the abutment portion of the valve seat member 10 are welded along the entire periphery by a laser beam B. Moreover, the valve seat member 10 is formed from a material that has a higher hardness than that of the cylindrical magnetic body 9, for example SUS 440C, and while offsetting an irradiation point P of the laser beam B from a laser torch 61 toward the cylindrical magnetic body 9 side relative to a position at which the front end of the cylindrical magnetic body 9 and the valve seat member 9 abut against each other, the front end of the cylindrical magnetic body 9 and the abutment portion of the valve seat member 10 are subjected to welding by the laser beam B.

The operation of this embodiment is now explained. The valve seat member 10 is provided with the tubular press-fit portion 10*a*, which is press-fitted into the front portion of the cylindrical magnetic body 9, the large diameter portion 10*b*, which is formed so as to have a larger diameter than that of the tubular press-fit portion 10*a* and substantially the same outer diameter as the outer diameter of the cylindrical magnetic body 9, and the annular shoulder portion 10*c*, which is formed as a flat face perpendicular to the outer peripheral face of the tubular press-fit portion 10*a* and provides a connection between the tubular press-fit portion 10*a* and the large diameter portion 10*b*; the annular abutment receiving face 9*a* is formed at the front end of the cylindrical magnetic body 9 so as to define a right angle relative to the inner peripheral face of the cylindrical magnetic body 9, the annular abutment receiving face 9*a* abutting against the annular shoulder portion 10*c* over substantially the entire face thereof when the tubular press-fit portion 10*a* is press-fitted into the front portion of the cylindrical magnetic body 9, and the front end of the cylindrical magnetic body 9 and the abutment portion of the valve seat member 10 are welded along the entire periphery.

Therefore, compared with a conventional arrangement in which an annular step portion is formed in the interior of a cylindrical magnetic body, the cylindrical magnetic body 9 can be made thinner, and it is possible to avoid an increase in the outer diameter of the cylindrical magnetic body 9, thereby contributing to a reduction in the dimensions of the electromagnetic fuel injection valve. Moreover, since the abutment receiving face 9*a* is formed so as to define a right angle relative to the inner peripheral face of the cylindrical magnetic body 9, the coaxiality improves markedly, thus enabling the guide clearance between the valve body 10 and movable core 18 and the valve seat member 10 and cylindrical magnetic body 9 to be reduced and thereby improving the magnetic efficiency and the responsiveness. Furthermore, since the front end of the cylindrical magnetic body 9 and the abutment portion of the valve seat member 10, which have substantially the same outer diameter, are welded along the entire periphery, it is possible to weld the cylindrical magnetic body 9 and the valve seat member 10 together via relatively thick portions, thereby enabling thermal distortion from welding to be suppressed to a low level.

Furthermore, since the valve seat member 10 is formed from a material that has a higher hardness than that of the cylindrical magnetic body 9, and the front end of the cylindrical magnetic body 9 and the abutment portion of the valve seat member 10 are subjected to welding by the laser beam B while offsetting the irradiation point P of the laser beam B toward the cylindrical magnetic body 9 side relative to the position at which the front end of the cylindrical magnetic body 9 and the valve seat member 10 abut against each other, it is possible to avoid heat of the laser beam B from being applied directly to the valve seat member 10, which has a relatively high hardness, thereby preventing the valve seat member 10 from cracking during welding.

Moreover, by forming the stopper 28 and the movable core 18 by simultaneously grinding the rear ends of the stopper material 28' and the movable core material 18' so that the rear end of the stopper 28 projects from the rear end of the movable core 18 by a predetermined amount that corresponds to an air gap required between the movable core 18 and the fixed core 22, it is possible to set a desired air gap without requiring a plurality of types of components corresponding to different air gaps.

Furthermore, since the value obtained by adding a desired value corresponding to a required valve operating stroke to the second distance L2 between the rear end of the stopper 28 and the annular step portion 10*c* of the valve member 10 becomes equal to the first distance L1 between the front end of the fixed core 22 and the front end of the cylindrical magnetic body 9, the valve operating stroke can be adjusted by simultaneously grinding the rear ends of the stopper material 28' and the movable core material 18' so that the second distance L2 becomes smaller than the measured first distance L1 by the desired value, thereby decreasing the number of production steps.

Furthermore, it is possible to make the first distance L1 constant regardless of whether or nor the valve operating stroke changes, thus making it easy to manage, and since the valve seat member 10 is not subjected to machining when assembling the electromagnetic fuel injection valve, the valve seat member 10 and the cylindrical magnetic body 9 can be joined together by utilizing the precision of each component, thereby enabling the coaxial precision between the valve seat member 10 and the cylindrical magnetic body 9 to be enhanced.

An embodiment of the present invention is explained above, but the present invention is not limited to the above-mentioned embodiment and can be modified in a variety of ways without departing from the spirit and scope of the present invention described in the claims.

The invention claimed is:

1. A process for producing an electromagnetic fuel injection valve in which the rear end of a cylindrical magnetic body is coaxially joined to a fixed core via a cylindrical non-magnetic body, the front end of the cylindrical magnetic body being coaxially joined to a valve seat member having a valve seat so that the cylindrical magnetic body and the valve seat member together form a valve housing, and a valve assembly is formed by coaxially connecting a movable core and a valve body, the movable core having a rear end thereof opposing the front end of the fixed core so that an end of the movable core that is in proximity to the fixed core is restrained, the valve body being housed in the valve housing so that the valve body can be seated on the valve seat, and the valve assembly being spring-biased toward the side on which the valve body is seated on the valve seat, the process comprising in sequence:

a first step of providing the valve seat member with a tubular press-fit portion that can be press-fitted into a front portion of the cylindrical magnetic body, a large diameter portion that is formed so as to have a larger diameter than that of the tubular press-fit portion and substantially the same outer diameter as the outer diameter of the cylindrical magnetic body, and an annular shoulder portion that is formed as a flat face perpendicular to an outer peripheral face of the tubular press-fit portion and provides a connection between the tubular press-fit portion and the large diameter portion, and fixing a stopper material made of a non-magnetic material for forming a stopper that is to abut against the fixed core to the rear end of a movable core material for forming the movable core;

a second step of measuring a first distance between the front end of the fixed core and the front end of the cylindrical magnetic body in a state in which the cylindrical magnetic body is coaxially joined to the fixed core via the cylindrical non-magnetic body;

a third step of forming the stopper and the movable core by simultaneously grinding rear ends of the stopper material and the movable core material so that a second distance between the annular shoulder portion and the rear end of the stopper projecting by a predetermined amount from the rear end of the movable core in a state in which the valve body is seated on the valve seat and the valve seat member and the valve assembly are held coaxially is smaller than the first distance by a desired value; and a fourth step of butt-welding the cylindrical magnetic body and the valve seat member in a state in which the tubular press-fit portion is press-fitted into the front portion of the cylindrical magnetic body until the annular shoulder portion abuts against the front end of the cylindrical magnetic body.

* * * * *